United States Patent [19]

Hutcheon et al.

[11] Patent Number: 4,860,151
[45] Date of Patent: Aug. 22, 1989

[54] ELECTRICAL SAFETY BARRIERS

[75] Inventors: Ian C. Hutcheon, Luton; David J. Epton, Dunstable, both of England

[73] Assignee: Measurement Technology Limited, Bedfordshire, United Kingdom

[21] Appl. No.: 247,007

[22] Filed: Sep. 2, 1988

[30] Foreign Application Priority Data

Sep. 26, 1987 [GB] United Kingdom ................. 8722679

[51] Int. Cl.[4] ............................................. H02H 3/20
[52] U.S. Cl. ........................................ 361/91; 361/1;
361/11; 361/56; 361/52; 307/326
[58] Field of Search ..................... 361/1, 2, 10, 11, 54,
361/56, 58, 88, 91, 111; 307/326, 327

[56] References Cited

U.S. PATENT DOCUMENTS 3,309,542  3/1967  Elliot ........................................ 361/1
3,445,679  5/1969  Meyer et al. ............................. 361/1
4,412,265 10/1983  Buuck ................................. 361/56 X

FOREIGN PATENT DOCUMENTS 2094572  9/1982  United Kingdom ..................... 361/1

Primary Examiner—Derek S. Jennings
Attorney, Agent, or Firm—Seidel, Gonda, Lavorgna & Monaco

[57] ABSTRACT

An electrical safety barrier which is adapted to pass a current returning from a hazardous area to a safe area but which will transmit negligible energy from the safe area to the hazardous area under fault conditions has in its return channel a fuse, shunt diodes and additional diodes. These additional diodes are either conventional rectifier diodes positioned at the safe-area end of the return channel or are Schottky diodes or diodes with a low forward voltage drop positioned at the hazardous-area end of the return channel.

7 Claims, 1 Drawing Sheet

ELECTRICAL SAFETY BARRIERS

FIELD OF THE INVENTION

This invention relates to electrical safety barriers and particularly to shunt-diode safety barriers as used for example for protecting electrical circuits and apparatus located in hazardous areas.

The present invention is particularly concerned with the diode return type safety barrier. This may be used, in conjunction with another safety barrier or power supply, where a switch in a hazardous area is required to control the operation of a load, such as a relay or other device, in a safe area.

It is an object of the present invention to provide an improved safety barrier which will pass a current returning from a hazardous area but which will transmit negligible energy in the other direction under fault conditions. This can be achieved by incorporating diode means within the return barrier. The return barrier can be used readily in combination with other barriers, and in practice often forms part of a 2-channel unit. Prior art diode-return safety barriers are known in which series diodes are provided at the hazardous-area end of the safety barrier. However, the disadvantage of having the diodes at the hazardous-area end of the safety barrier is that high power Zener diodes are required.

SUMMARY OF THE INVENTION

It is an object of the invention to overcome this disadvantage.

In accordance with one aspect of the present invention there is provided an electrical safety barrier adapted to pass a current returning from a hazardous area to a safe area but which will transmit negligible energy from the safe area to the hazardous area under fault conditions, the barrier comprising a return channel from the hazardous area including shunt-diode means, fuse means and one or more diodes positioned on the safe-area side of said shunt-diode means.

The advantage thereby achieved is that by moving the diodes to the safe-area end of the barrier one can then use low power Zener diodes.

In accordance with another aspect of the present invention there is provided an electrical safety barrier adapted to pass a current returning from a hazardous area to a safe area but which will transmit negligible energy from the safe area to the hazardous area under fault conditions, the barrier comprising a return channel from the hazardous area including shunt-diode means, fuse means and one or more Schottky diodes or diodes with a low forward voltage drop positioned at the hazardous-area end of the return channel.

The use of Schottky diodes or other diodes having a low forward voltage drop means that the barrier drops less voltage in the loop. However, because Schottky diodes have a relatively low reverse voltage breakdown they must be positioned at the hazardous-area end of the barrier.

BRIEF DESCRIPTION OF THE DRAWINGS

In order better to illustrate the present invention reference is now made to the accompanying drawing, in which.

DESCRIPTION OF THE PREFERRED EMBODIMENTS

Figure 1:
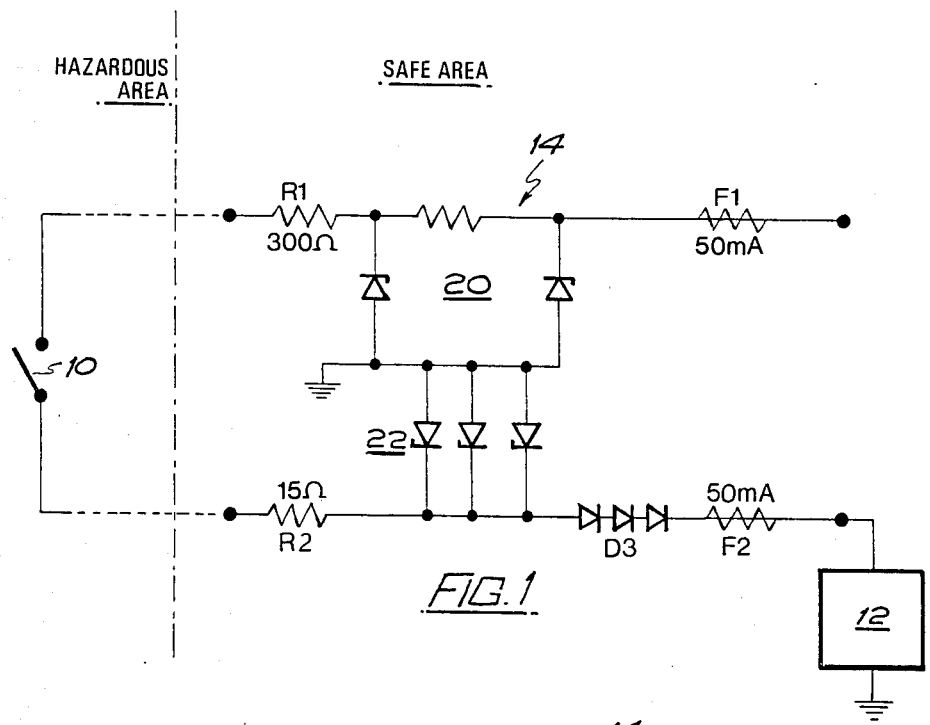
FIG. 1 is a schematic circuit diagram of a first embodiment of shunt-diode safety barrier incorporating a diode-return channel in accordance with the present invention; and, FIG. 2 is a schematic circuit diagram of an alternative embodiment of safety barrier using Schottky diodes.

In the embodiment shown in FIG. 1 a switch 10 is located within a hazardous area and controls a load 12, such as a relay, located in a safe area, via a safety barrier which is indicated generally at 14. The safety barrier comprises a first channel having a fuse F1, a chain or chains 20 of Zener or other diodes connected in shunt, and a terminating resistance R1.

The return channel from the hazardous area comprises a resistor R2, two or three low-power Zener diodes 22 connected in shunt, and a fuse F2. Incorporated within the return channel are two or three conventional rectifier diodes D3 connected in series and having a relatively high reverse voltage rating. These diodes D3 are located at the safe-area end of the safety barrier between the shunt diodes 22 and the fuse F2. This arrangement is appropriate in applications where the voltage drop is not critical. With the diodes D3 located at the safe-area end of the barrier, under fault conditions, the Zener diodes 22 cannot conduct in the reverse direction and the power dissipated in them is greatly reduced, thus allowing the use of smaller and therefore lower-cost Zener diodes.

Figure 2:
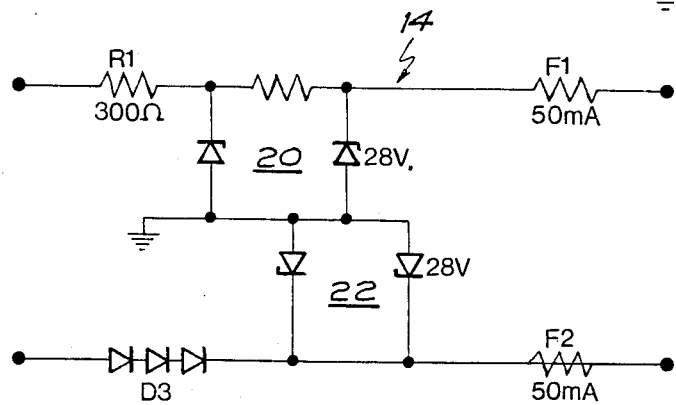

In the alternative embodiment shown in FIG. 2, the series diodes D3 in the return channel are positioned at the hazardous-area end of the safety barrier 14. In this position the voltage which can be applied to them from the safe area is limited to a low value by the fuse F2 and the Zener diodes 22. Therefore, in accordance with the invention, the series diodes D3 are Schottky diodes which have a relatively low reverse-voltage rating but the advantage of a substantially lower forward voltage drop. This lower forward voltage drop is helpful in applications where the available voltage in the circuit is marginal, as for example with many 2-wire transmitters.

The Schottky diode uses the potential barrier resulting from a metal to semiconductor contact. Schematically, it consists of a metal layer deposited on an epitaxial N silicon layer grown on a low resistivity N+ substrate. Around the metal to silicon junction is implanted or diffused a P zone in the form of a ring which enables the electrical field concentration to be reduced. As a result the breakdown voltage is increased and the leakage current reduced. Current flows through the diode as in a conventional P/N junction, but the saturation current based on thermionic emission is about $10^6$ times higher, providing low turn-on voltage with a higher reverse current than that of a P/N junction.

In considering the static forward and reverse characteristics of a Schottky diode and a conventional P/N junction diode, the forward voltage drop of the Schottky diode is about half that of the P/N diode. This is exemplified by the static characteristics of a Thomson Semiconductors type BAT 42 Schottky diode as compared with a IN 4148 type P/N junction diode.

Thus, references herein to a Schottky diode are to be understood as including any other diode having a substantially lower forward voltage drop than a conventional P/N junction diode, especially diodes where the forward voltage drop is approximately half that of a conventional rectifier diode.

The present invention is concerned with the provision of diodes in a diode-return barrier, which may be used with conventional safety barriers, safety barriers which incorporate current-limiting circuits, and intrinsically safe power supplies.

We claim:

1. An electrical safety barrier adapted to pass a current returning from a hazardous area to a safe area but which will transmit negligible energy from the safe area to the hazardous area under fault conditions, the barrier comprising a return channel from the hazardous area including shunt-diode means, fuse means and one or more diodes positioned on the safe-area side of said shunt-diode means.

2. A safety barrier according to claim 1, in which said one or more diodes comprise a plurality of rectifier diodes connected in series.

3. A safety barrier according to claim 1, in which said one or more diodes are connected between the shunt-diode means and the fuse means, with the fuse means being more remote from the hazardous area then said one or more diodes.

4. A safety barrier according to claim 1, in which the shunt-diode means comprises Zener diodes.

5. An electrical safety barrier adapted to pass a current returning from a hazardous area to a safe area but which will transmit negligible energy from the safe area to the hazardous area under fault conditions, the barrier comprising a return channel from the hazardous area including shunt-diode means, fuse means and one or more Schottky diodes or diodes having a low forward voltage drop positioned at the hazardous-area end of the return, channel.

6. A safety barrier according to claim 5, in which the Schottky diode or diodes is/are positioned on the side of the shunt-diode means adjacent to the hazardous area and the fuse means is positioned on the side of the shunt-diode means remote from the hazardous area.

7. A safety barrier according to claim 5, in which the shunt-diode means comprises Zener diodes.

* * * * *

UNITED STATES PATENT AND TRADEMARK OFFICE
CERTIFICATE OF CORRECTION

PATENT NO. : 4,860,151

DATED : August 22, 1989

INVENTOR(S) : Hutcheon, et al.

It is certified that error appears in the above-identified patent and that said Letters Patent is hereby corrected as shown below: On the title page:

In the Filing Date:

Change "Sep. 2, 1988" to -- Sep. 20, 1988 --.

In the Claims:

Claim 5, line 9, delete the comma between the words "return" and "channel".

Signed and Sealed this

Thirty-first Day of July, 1990

Attest:

HARRY F. MANBECK, JR.

*Attesting Officer*         *Commissioner of Patents and Trademarks*